(12) United States Patent
Li

(10) Patent No.: US 10,768,270 B2
(45) Date of Patent: Sep. 8, 2020

(54) ELECTRONIC DEVICE WITH LASER MARKING FUNCTION AND LASER MARKING METHOD

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Li-Hong Li, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

(*) Notice: Subject to any disclaimer, the term of this patent is extended or adjusted under 35 U.S.C. 154(b) by 328 days.

(21) Appl. No.: 15/859,718

(22) Filed: Jan. 1, 2018

(65) Prior Publication Data

US 2018/0321355 A1 Nov. 8, 2018

(30) Foreign Application Priority Data

May 8, 2017 (CN) .......................... 2017 1 0317218

(51) Int. Cl.
| G01S 5/14 | (2006.01) |
| G03B 21/56 | (2006.01) |
| G01S 5/30 | (2006.01) |
| G01S 5/06 | (2006.01) |
| G01S 5/22 | (2006.01) |
| G01S 5/16 | (2006.01) |

(52) U.S. Cl.
CPC .................. *G01S 5/14* (2013.01); *G01S 5/06* (2013.01); *G01S 5/16* (2013.01); *G01S 5/22* (2013.01); *G01S 5/30* (2013.01); *G03B 21/56* (2013.01)

(58) Field of Classification Search
CPC combination set(s) only.
See application file for complete search history.

(56) References Cited

U.S. PATENT DOCUMENTS

| 2014/0015806 A1* | 1/2014 | Koeppe | .................. G06F 3/042 345/175 |
| 2017/0176575 A1* | 6/2017 | Smits | ...................... G01S 17/10 |
| 2018/0180733 A1* | 6/2018 | Smits | ..................... G01S 7/4868 |

* cited by examiner

*Primary Examiner* — Mamadou L Diallo
(74) *Attorney, Agent, or Firm* — ScienBiziP, P.C.

(57) ABSTRACT

A laser marking method for an electronic device with a projector and a projection screen includes first and second microwaves being received by microwave receivers on corners or elsewhere of the projection screen. First and second microwave transmitters in a laser pen transmit the microwaves. Time intervals between transmissions and receptions of the microwaves are acquired. Distances between each of the microwave receivers and each of first and second microwave transmitters are calculated, to establish a three-dimensional rectangular coordinate system. Coordinate value of a point on the screen struck by laser beam (drop point) from the pen is calculated. The method allows for marking the drop point on the screen and also for marking a series of drop points with a line when the laser beam moves across the screen.

16 Claims, 4 Drawing Sheets

ELECTRONIC DEVICE WITH LASER MARKING FUNCTION AND LASER MARKING METHOD

CROSS-REFERENCE TO RELATED APPLICATIONS

This application claims priority to Chinese Patent Application No. 201710317218.3 filed on May 8, 2017, the contents of which are incorporated by reference herein.

FIELD

The subject matter herein generally relates to wireless transmission technology, and particularly to an electronic device with a laser marking function and a laser marking method.

BACKGROUND

Projection system is widely used. A laser pen can be used in the projection system, for pointing out projection content. However, functions of the laser pen are limited, for example, the laser pen cannot mark the projected content.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
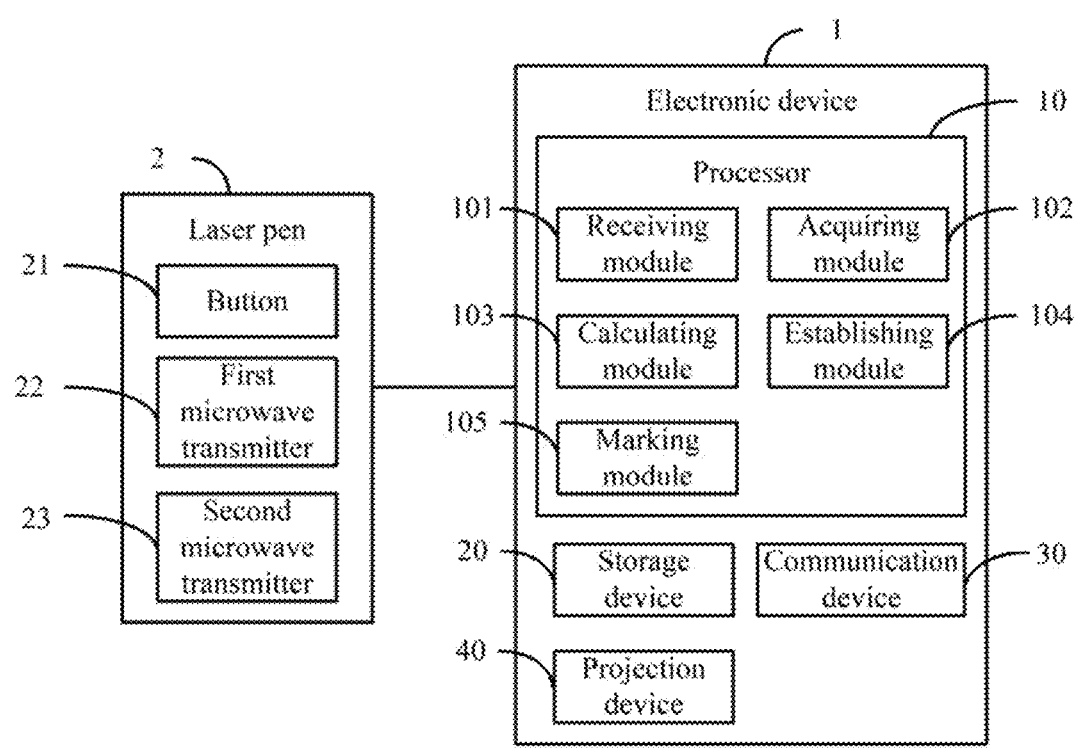
FIG. 1 is a block diagram illustrating an exemplary embodiment of an electronic device with a laser marking function.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

FIG. 1 illustrates an exemplary embodiment of an electronic device 1 with a laser marking function. The electronic device 1 includes, but is not limited to, a processor 10, a storage device 20, a communication device 30, and a projection device 40. In at least one exemplary embodiment, the electronic device 1 can be a smart phone, a personal computer, or a smart television. FIG. 1 illustrates only one example of the electronic device 1, other examples can include more or fewer components than illustrated, or have a different configuration of the various components in other embodiments.

In at least one exemplary embodiment, the storage device 20 can include various types of non-transitory computer-readable storage mediums. For example, the storage device 20 can be an internal storage system, such as a flash memory, a random access memory (RAM) for temporary storage of information, and/or a read-only memory (ROM) for permanent storage of information. The storage device 20 can also be an external storage system, such as a hard disk, a storage card, or a data storage medium. The at least one processor 10 can be a central processing unit (CPU), a microprocessor, or other data processor chip that performs functions of the electronic device 1.

In at least one exemplary embodiment, the communication device 30 can be a wireless module, such as WI-FI module or BLUETOOTH module. The communication device 30 can communicate with a laser pen 2.

In at least one exemplary embodiment, the projection device 40 can be built in the electronic device 1 or an external device which is connected with the electronic device 1. The projection device 40 at least includes a projection screen 41.

Figure 2:
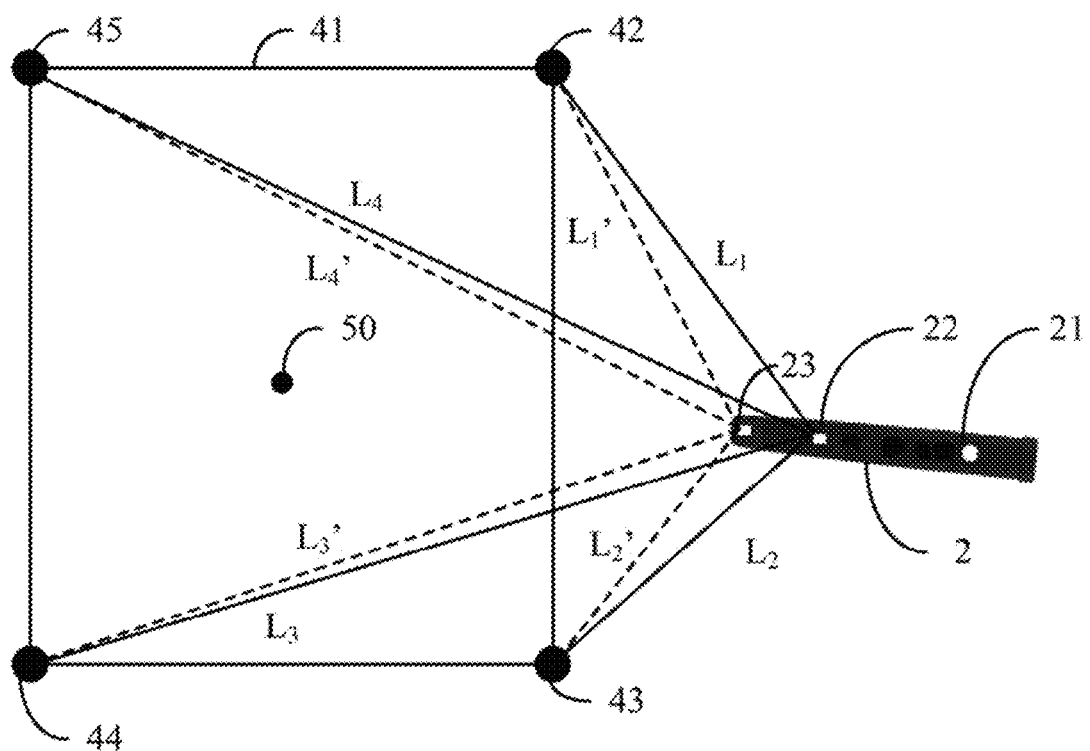
FIG. 2 is a schematic view illustrating positional relationship of a projection screen and a laser pen of the electronic device of an exemplary embodiment.

Referring to FIG. 2, when the laser pen 2 transmits a visible laser beam to the projection screen 41, a drop point 50 is formed on the projection screen 41. The electronic device 1 can mark the drop point 50, which is convenient for a user to emphasize designated content displayed on the projection screen 41.

In at least one exemplary embodiment, the projection device 40 defines a number of microwave receivers on a number of predefined positions of the projection screen 41. The number of predefined positions includes four vertexes of the projection screen 41, a microwave receiver being arranged on a vertex of the projection screen 41. In detail, a first microwave receiver 42, a second microwave receiver 43, a third microwave receiver 44, and a fourth microwave receiver 45 are respectively defined on one of the four vertexes of the projection screen 41.

In at least one exemplary embodiment, the laser pen 2 at least includes a button 21, a first microwave transmitter 22, and a second microwave transmitter 23. The button 21 is located on an end of the laser pen 2. The first microwave transmitter 22 is located on a middle position of the laser pen 2. The second microwave transmitter 23 is located on the other end of the laser pen 2. In at least one exemplary embodiment, the four microwave receivers can receive microwaves transmitted by the two microwave transmitters. The microwave transmitted by the two microwave transmitters can be infrared ray or ultrasonic wave.

As illustrated in FIG. 1, the electronic device 1 at least includes a receiving module 101, an acquiring module 102, a calculating module 103, an establishing module 104, and a marking module 105. The modules 101-105 can be collections of software instructions stored in the storage device 20 of the electronic device 1 and executed by the processor 10. The modules 101-105 also can include functionality represented as hardware or integrated circuits, or as software and hardware combinations, such as a special-purpose processor or a general-purpose processor with special-purpose firmware.

When the user utilizes the laser pen 2 to point at the project screen 41, the button 21 can be pressed by the user. The drop point 50 is the point on the projection screen 41 which is struck by the laser beam. When the button 21 is pressed, the laser pen 2 controls the first microwave transmitter 22 to transmit a first microwave, and controls the second microwave transmitter 23 to transmit a second microwave.

The receiving module 101 is used to control the first microwave receiver 42, the second microwave receiver 43, the third microwave receiver 44, and the fourth microwave receiver 45 to receive the first microwave transmitted by the first microwave transmitter 22 and the second microwave transmitted by the second microwave transmitter 23.

The acquiring module 102 is used to acquire time intervals between the time when the two microwave transmitters transmit the microwave and the time when each of the four microwave receivers receives the microwave.

In at least one exemplary embodiment, when the first microwave transmitter 22 and the second microwave transmitter 23 transmit the microwave, the laser pen 2 transmits a signal to the electronic device 1. The electronic device 1 can thus acquire the time when the two microwave transmitters transmit the microwave. When any one of the four microwave receivers receives the microwave, the projection device 40 transmits a signal to the electronic device 1, the electronic device 1 can thus acquire the time when any microwave receiver receives the microwave.

The calculating module 103 is used to calculate the distances between the four microwave receivers and the first microwave transmitter 22, and the distances between the four microwave receivers and the second microwave transmitter 23.

As illustrated in FIG. 2, the distance between the first microwave receiver 42 and the first microwave transmitter 22 is $L_1$, and the distance between the first microwave receiver 42 and the second microwave transmitter 23 is $L_1'$. The distance between the second microwave receiver 43 and the first microwave transmitter 22 is $L_2$, and the distance between the second microwave receiver 43 and the second microwave transmitter 23 is $L_2'$. The distance between the third microwave receiver 44 and the first microwave transmitter 22 is $L_3$, and the distance between the third microwave receiver 44 and the second microwave transmitter 23 is $L_3'$. The distance between the fourth microwave receiver 45 and the first microwave transmitter 22 is $L_4$, and the distance between the fourth microwave receiver 45 and the second microwave transmitter 23 is $L_4'$.

The establishing module 104 is used to establish a three-dimensional rectangular coordinate system. An origin point of the rectangular coordinate system can be the position of one microwave receiver, an x-axis of the rectangular coordinate system can be the length of the projection screen 41, a y-axis of the rectangular coordinate system can be the width of the projection screen 41, and a z-axis of the rectangular coordinate system can be perpendicular to the projection screen 41.

Figure 3:
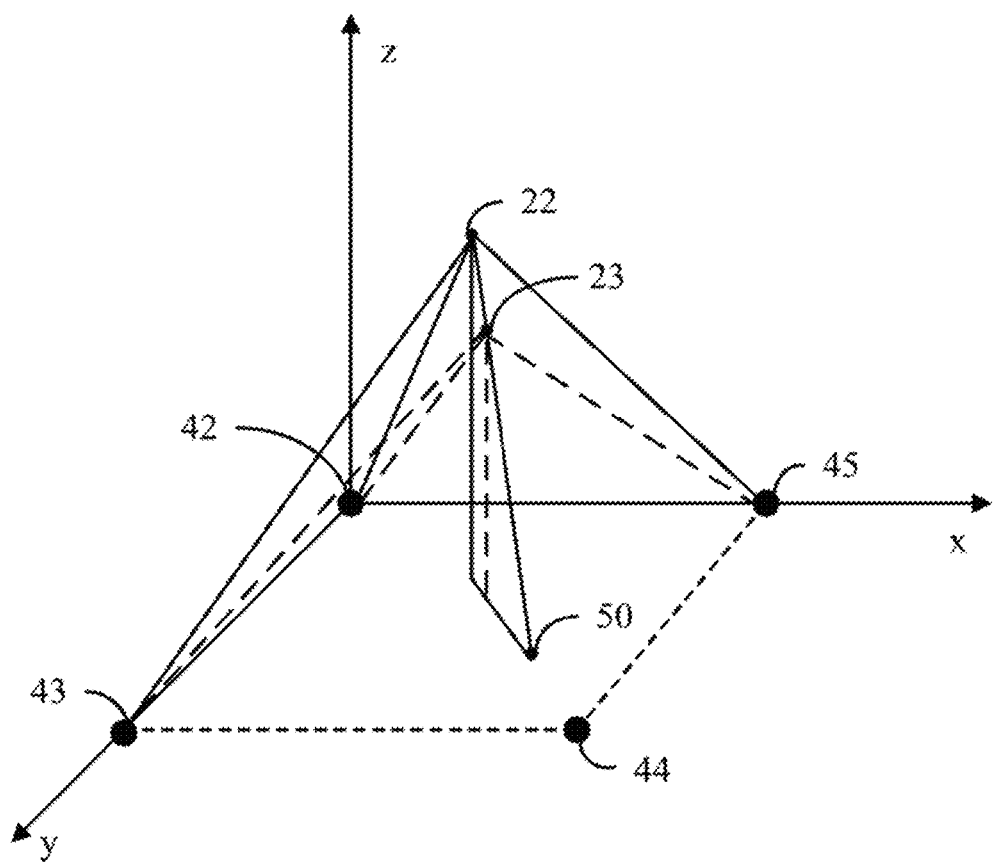
FIG. 3 is a schematic view illustrating a three-dimensional rectangular coordinate system of an exemplary embodiment.

Referring to FIG. 3, for example, the origin point is the position of the first microwave receiver 42. The width of the projection screen 41 is assumed as a, the length of the projection screen 41 is assumed as b, thus the coordinate value corresponding to the first microwave receiver 42 is (0, 0, 0). The coordinate value corresponding to the second microwave receiver 43 is (a, 0, 0), the coordinate value corresponding to the third microwave receiver 44 is (a, b, 0), and the coordinate value corresponding to the fourth microwave receiver 45 is (0, b, 0).

The calculating module 103 further calculates a coordinate value of the drop point 50 on the projection screen 41, according to the coordinate values of the four microwave receivers, and the respective distances between the four microwave receivers and the first and second microwave transmitters 22 and 23.

In at least one exemplary embodiment, the calculating module 103 firstly calculates coordinate values of the two microwave transmitters according to the coordinate values of the four microwave receivers, the distances between the four microwave receivers and the first microwave transmitter 22, and the distances between the four microwave receivers and the second microwave transmitter 23. The coordinate value of the drop point 50 according to the coordinate values of the two microwave transmitters is then calculated.

As illustrated in FIG. 3, for example, the coordinate value of the first microwave transmitter 22 is assumed as $(x_1, y_1, z_1)$. With relationship between the coordinate value of the first microwave transmitter and the coordinate values of the four microwave transmitters, following equations are applied:

$$x_1^2 + y_1^2 + z_1^2 = L_1^2 \quad \text{(equation 1)}$$

$$y_1^2 + (a-x_1)_1^2 + z_1^2 = L_2^2 \quad \text{(equation 2)}$$

$$x_1^2 + (b-y_1)^2 + z_1^2 = L_4^2 \quad \text{(equation 3)}$$

The calculating module 103 can calculate values of $x_1$, $y_1$, and $z_1$ according to equations 1, 2, and 3.

For example, the coordinate value of the second microwave transmitter 23 is assumed as $(x_2, y_2, z_2)$. The calculating module 103 can calculate values of $x_2$, $y_2$, and $z_2$ as illustrated above.

The coordinate value of the drop point 50 is assumed as (x, y, 0). A coordinate value of a mapping point of the first microwave transmitter 22 on the projection screen 41 is $X_1$ $(x_1, y_1, 0)$, and a coordinate value of a mapping point of the second microwave transmitter 23 on the projection screen 41 is $X_2$ $(x_2, y_2, 0)$. Linear relationship between drop point 50 and the two mapping points $X_1$, $X_2$ is:

$$y = (y_2 - y_1) * x/(x_2 - x_1) + [y_1 - x*(y_2 - y_1)/(x_2 - x_1)] \quad \text{(equation 4)}$$

The distance between the two microwave transmitters is L, a following equation is applied:

$$\sqrt{(x-x_1)^2+(y-y_1)^2}-\sqrt{(x-x_2)^2+(y-y_2)^2}=\sqrt{L^2-(z_1-z_2)^2} \quad \text{(equation 5)}$$

The calculating module 103 can calculate the values of x and y by applying equations 4 and 5, then the coordinate value of the drop point 50 can be determined.

The marking module 105 is used to mark the drop point 50 on the projection screen 41 according to the coordinate value of the drop point 50. In at least one exemplary embodiment, the marking module 105 marks the drop point 50 by displaying a dot on the position of drop point 50.

In at least one exemplary embodiment, when the laser pen 2 is moving, the calculating module 103 calculates the coordinate values of a series of drop points 50 as illustrated above. The marking module 105 further marks a track of the drop points 50 according to the coordinate values of the drop points 50. In at least one exemplary embodiment, the marking module 105 marks the track of the drop points 50 by displaying a faint or a solid line on the position of the track of the drop points 50.

Figure 4:
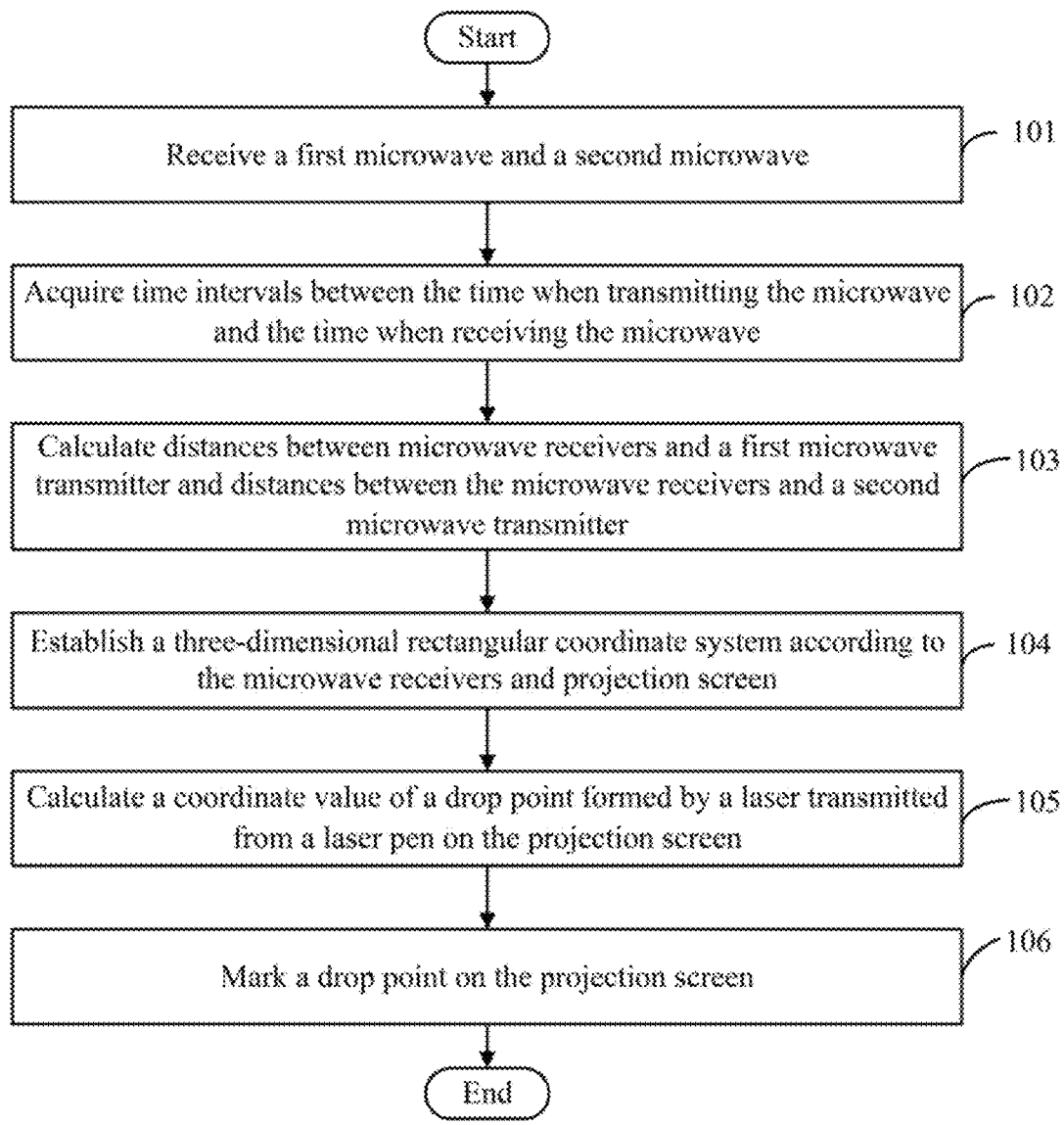
FIG. 4 illustrates a flowchart of an exemplary embodiment of a laser marking method.

FIG. 4 illustrates a flowchart of an exemplary embodiment of a laser marking method. The method is provided by way of example, as there are a variety of ways to carry out the method. The method described below can be carried out using the configurations illustrated in FIG. 1, for example, and various elements of these figures are referenced in explaining the example method. Each block shown in FIG. 4 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 101.

At block 101, a receiving module 101 controls a first microwave receiver 42, a second microwave receiver 43, a third microwave receiver 43, and a fourth microwave receiver 44 to receive a first microwave transmitted by a first microwave transmitter 22 and a second microwave transmitted by a second microwave transmitter 23.

At block 102, an acquiring module 102 acquires time intervals between the time when the two microwave transmitters transmit the microwave and the time when each of the four microwave receivers receives the microwave.

At block 103, a calculating module 103 calculates distances between the four microwave receivers and the first microwave transmitter, and distances between the four microwave receivers and the second microwave transmitter.

At block 104, an establishing module 104 establishes a three-dimensional rectangular coordinate system according to the four microwave receivers and a projection screen 41.

At block 105, the calculating module 103 further calculates a coordinate value of a drop point 50 formed by a laser beam transmitted from a laser pen on the projection screen. The coordinate value of the drop point 50 are calculated according to the coordinate values of the four microwave receivers, the respective distances between the four microwave receivers and the first and second microwave transmitters.

At block 106, a marking module 105 marks the drop point 50 on the projection screen 41 according to the coordinate value of the drop point 50.

The method further includes the calculating module 103 further calculating the coordinate values of a series of drop points 50, that is, when the laser beam moves across the projection screen 41. The marking module 105 marks a track of drop points 50 according to the coordinate values of the drop points 50.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. An electronic device with a laser marking function comprising:
    at least one processor;
    a projection device coupled to the at least one processor and comprising a projection screen, wherein a plurality of microwave receivers is arranged on a plurality of predefined positions of the projection screen; and
    a storage device coupled to the at least one processor and storing instructions for execution by the at least one processor to cause the at least one processor to:
        control the plurality of microwave receivers to receive a first microwave transmitted by a first microwave transmitter of a laser pen and a second microwave transmitted by a second microwave transmitter of the laser pen;
        acquire time intervals between the time when the two microwave transmitters transmit the microwave and the time when each of the plurality of microwave receivers receives the microwave;
        calculate distances between the plurality of microwave receivers and the first microwave transmitter, and distances between the plurality of microwave receivers and the second microwave transmitter;
        establish a three-dimensional rectangular coordinate system according to the plurality of microwave receivers and the projection screen;
        calculate a coordinate value of a drop point formed by a laser beam transmitted from the laser pen on the projection screen, according to the coordinate values of the plurality of microwave receivers, the respective distances between the plurality of microwave receivers and the first and second microwave transmitters; and
        mark the drop point on the projection screen according to the coordinate value of the drop point.

2. The electronic device according to claim 1, wherein the plurality of predefined positions comprise four vertexes of the projection screen, a microwave receiver being arranged on a vertex of the projection screen.

3. The electronic device according to claim 1, further comprising:
    a communication device communicating with the laser pen and comprising the plurality of microwave receivers.

4. The electronic device according to claim 1, wherein the projection device is built in the electronic device or is an external device connected with the electronic device.

5. The electronic device according to claim 1, wherein an origin point of the rectangular coordinate system is the position of one microwave receiver, an x-axis of the rectangular coordinate system is the length of the projection screen, a y-axis of the rectangular coordinate system is the width of the projection screen, and a z-axis of the rectangular coordinate system is perpendicular to the projection screen.

6. The electronic device according to claim 1, wherein the at least one processor is further caused to:
    calculate coordinate values of the two microwave transmitters according to the coordinate values of the plurality of microwave receivers, the distances between the plurality of microwave receivers and the first microwave transmitter, and the distances between the plurality of microwave receivers and the second microwave transmitter; and calculate the coordinate value of the drop point according to the coordinate values of the two microwave transmitters.

7. The electronic device according to claim 1, wherein the at least one processor is further caused to:

mark the drop point by displaying a dot on the position of drop point.

8. The electronic device according to claim 1, wherein the at least one processor is further caused to:

calculate the coordinate values of a series of drop points when the laser pen is moving; and mark a track of the drop points according to the coordinate values of the drop points.

9. The electronic device according to claim 8, wherein the at least one processor is further caused to:

mark the track of the drop points by displaying a faint or a solid line on the position of the track of the drop points.

10. A laser marking method comprising:

receiving a first microwave transmitted by a first microwave transmitter of a laser pen and a second microwave transmitted by a second microwave transmitter of the laser pen through a plurality of microwave receivers;

acquiring time intervals between the time when the two microwave transmitters transmit the microwave and the time when each of the plurality of microwave receivers receives the microwave;

calculating distances between the plurality of microwave receivers and the first microwave transmitter, and distances between the plurality of microwave receivers and the second microwave transmitter;

establishing a three-dimensional rectangular coordinate system according to the plurality of microwave receivers and a projection screen;

calculating a coordinate value of a drop point formed by a laser beam transmitted from the laser pen on the projection screen, according to the coordinate values of the plurality of microwave receivers, the respective distances between the plurality of microwave receivers and the first and second microwave transmitters; and marking the drop point on the projection screen according to the coordinate value of the drop point.

11. The method according to claim 10, wherein there are four microwave receivers arranged on four vertexes of the projection screen.

12. The method according to claim 11, wherein an origin point of the rectangular coordinate system is the position of one microwave receiver, an x-axis of the rectangular coordinate system is the length of the projection screen, a y-axis of the rectangular coordinate system is the width of the projection screen, and a z-axis of the rectangular coordinate system is perpendicular to the projection screen.

13. The method according to claim 10, wherein the step of calculating a coordinate value of a drop point comprises:

calculating coordinate values of the two microwave transmitters according to the coordinate values of the plurality of microwave receivers, the distances between the plurality of microwave receivers and the first microwave transmitter, and the distances between the plurality of microwave receivers and the second microwave transmitter; and calculating the coordinate value of the drop point according to the coordinate values of the two microwave transmitters.

14. The method according to claim 10, wherein the step of marking the drop point on the projection screen comprises:

marking the drop point by displaying a dot on the position of drop point.

15. The method according to claim 10, further comprising:

calculating the coordinate values of a series of drop points when the laser pen is moving; and marking a track of the drop points according to the coordinate values of the drop points.

16. The method according to claim 15, wherein the step of marking a track of the drop points comprises:

marking a moving track of the drop points by displaying a faint or a solid line on the position of the track of the drop points.

* * * * *